(12) United States Patent  (10) Patent No.: US 8,174,665 B2
Kim et al.  (45) Date of Patent: May 8, 2012

(54) LIQUID CRYSTAL DISPLAY AND METHOD FOR MANUFACTURING THE SAME

(75) Inventors: Bong Chul Kim, Daegu-di (KR); Hyeon Jin Seo, Gumsi-si (KR); Dhang Kwon, Daejeon-si (KR); Hang Sup Cho, Gumi-si (KR); Ho Su Kim, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 13/073,567

(22) Filed: Mar. 28, 2011

(65) Prior Publication Data

US 2011/0171766 A1 Jul. 14, 2011

Related U.S. Application Data

(62) Division of application No. 12/232,817, filed on Sep. 24, 2008, now Pat. No. 7,936,434.

(30) Foreign Application Priority Data

Sep. 28, 2007 (KR) ................................ 2007-097933

(51) Int. Cl.
G02F 1/1339 (2006.01)
(52) U.S. Cl. ........................................................ 349/155
(58) Field of Classification Search .................. 349/155, 349/187
See application file for complete search history.

(56) References Cited

U.S. PATENT DOCUMENTS

| 6,486,936 | B1 | 11/2002 | Sugimoto |
| 7,061,568 | B2 * | 6/2006 | Yamaguchi et al. .......... 349/155 |
| 7,453,545 | B2 | 11/2008 | Kim et al. |
| 7,630,042 | B2 * | 12/2009 | Yoon .............................. 349/129 |
| 2007/0247577 | A1 | 10/2007 | Yao et al. |
| 2007/0263165 | A1 * | 11/2007 | Sung et al. .................... 349/187 |

* cited by examiner

*Primary Examiner* — Eric Wong
(74) *Attorney, Agent, or Firm* — McKenna Long & Aldridge, LLP

(57) ABSTRACT

Disclosed is a liquid crystal display (LCD) device and a method for manufacturing the same, capable of maintaining a cell gap and preventing press defects caused by application of a predetermined external pressure via the use of ball spacers.

5 Claims, 8 Drawing Sheets

LIQUID CRYSTAL DISPLAY AND METHOD FOR MANUFACTURING THE SAME

This application is a Divisional of application Ser. No. 12/232,817 filed Sep. 24, 2008 now U.S. Pat. No. 7,936,434, now allowed, which claims priority to Korean Patent Application No. 10-2007-0097933, filed Sep. 28, 2007, each of which is incorporated by reference in its entirety for all purposes as if fully set forth herein.

BACKGROUND OF THE INVENTION

1. Field of the Invention

The present invention relates to a liquid crystal display (LCD) device. More particularly, the present invention relates to a liquid crystal display (LCD) device and a method for manufacturing the same, capable of maintaining a cell gap and preventing press defects caused by application of external pressure via the use of ball spacers.

2. Discussion of the Related Art

With the progress of a information-dependent society, the demand for various display devices has increased. To meet such demands, efforts have recently been made to research flat panel display devices such as liquid crystal displays (LCDs), plasma display panels (PDPs), electro-luminescent displays (ELDs) and vacuum fluorescent displays (VFDs). Some types of such flat panel displays are being practically applied to various appliances for display purposes.

Of these, LCDs are currently most widely used as substitutes for cathode ray tubes (CRTs) in association with mobile image display devices because LCDs offer advantages such as superior picture quality, lightweight, slimness, and low power consumption. Various applications of LCDs are being developed in association with not only mobile image display devices such as monitors of notebook computers, but also monitors of TVs to receive and display broadcast signals, and monitors of laptop computers.

Successful application of such LCDs to diverse image display devices depends on whether or not the LCDs can realize desired high picture quality including high resolution, high brightness, large display area, and the like, while maintaining desired characteristics of lighweight, slimness and low power consumption.

Hereinafter, the structure of a related art LCD device will be described with reference to the attached drawings.

FIG. 1 is a plan view illustrating a related art LCD provided with a column spacer.

As shown in FIG. 1, a related art LCD array region comprises gate lines 4 and data lines (not shown) that cross each other to define pixel regions, thin film transistors (TFT) each formed at a crossing between the gate lines 4 and the data lines, and pixel electrodes 6 formed in each of the pixel regions. The array region further comprises column spacers 20 uniformly spaced apart from one another, to maintain a cell gap. In FIG. 1, column spacers 20 are arranged at respective pixels, each of which includes three sub-pixels, i.e., R, G and B sub-pixels.

As shown in FIG. 1, each column spacer 20 is arranged in a region provided above the gate line 4. That is, the gate line 4 is arranged on a first substrate 1, a gate insulating film 15 is arranged over the entire surface of the first substrate 1 including the gate line 4, and a passivation film 16 is arranged on the gate insulating film 15.

Meanwhile, a second substrate 2 comprises a black matrix layer 7 to shield non-pixel regions (portions where gate lines, data lines and thin film transistors are formed) other than the pixel regions. In addition, R, G and B color filter layers are formed at respective pixel regions on the second substrate 2 including the black matrix layer 7, and a common electrode 14 is arranged over the entire surface of the second substrate 2 including the color filter layers 8.

The column spacers 20 are formed on portions of the common electrode 14 corresponding to the gate lines 4. Accordingly, the first and second substrates 1 and 2 are joined together such that the column spacers 20 are arranged on the gate lines 4.

The column spacers 20 are formed in an array process of the first substrate 1 or the second substrate 2. The column spacers 20 are fixedly formed in the form of columns with a certain height on the predetermined substrate.

The column spacers 20 are fixed in specific positions and thus do not move, when liquid crystals are dropped to form a liquid crystal layer. Advantageously, the column spacers do not inhibit the liquid crystals from flowing. However, the column spacers have a large area in contact with the corresponding substrate, thus disadvantageously causing display defects, e.g., touch defects.

The LCDs including afore-mentioned column spacers suffer from the following problems.

A region, where the liquid crystal panel of the related art column spacers—comprising LCDs is touched in a certain direction by hand or other objects, is stained. This stain is formed upon touch and is thus referred to as a "touch stain". As such, the stain is observed on the screen and thus is also called a "touch defect". Such a touch defect is considered to be attributed to the high frictional force which is caused by the large contact area between the column spacer and the corresponding substrate, as compared to related art ball spacer structures. That is, because column spacers have a large area in contact with the corresponding substrate, as compared, for example, to ball spacers, after upper and lower substrates shift towards each other upon touching, they take a long time to return to an original state and stains thus remain until they completely return to the original state.

Accordingly, efforts have been made to use ball spacers in liquid crystal panels. In these cases, the ball spacers move and deviate from their original positions during fabrication and use due to their mobility. Thus, causing other problems. Research is being conducted on solving these problems.

SUMMARY OF THE INVENTION

Accordingly, the present invention is directed to a liquid crystal display (LCD) device and a method for manufacturing the same that substantially obviates one or more problems due to limitations and disadvantages of the related art.

An advantage of the present invention is to provide a liquid crystal display (LCD) device and a method for manufacturing the same, capable of maintaining a cell gap and preventing press defects caused by application of a predetermined external pressure via the use of ball spacers.

Additional advantages, and features of the invention will be set forth in part in the description which follows and in part will become apparent to those having ordinary skill in the art upon examination of the following or may be learned from practice of the invention. These and other advantages of the invention may be realized and attained by the structure particularly pointed out in the written description and claims hereof as well as the appended drawings.

To achieve these and other advantages and in accordance with the purpose of the present invention, as embodied and broadly described herein, a liquid crystal display device comprises: a first substrate and a second substrate facing each other; a plurality of gate lines and a plurality of data lines formed in respective non-pixel regions on the first substrate such that the gate lines and the data lines cross each other to define pixel regions; a plurality of thin film transistors formed at intersections between the gate lines and the data lines; a black matrix layer formed on the second substrate in portions corresponding to the non-pixel regions; a plurality of spacers formed in predetermined portions provided on the black matrix layer between the first and second substrates, wherein each spacer includes one or more first balls having a first diameter, one or more second balls having a second diameter smaller than the first diameter, and a solid to aggregate the first and second balls together; and a liquid crystal layer filled between the first substrate and the second substrate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Hereinafter, an LCD device and a method for manufacturing the same according to the present invention will be described with reference to the attached drawings.

Figure 1:
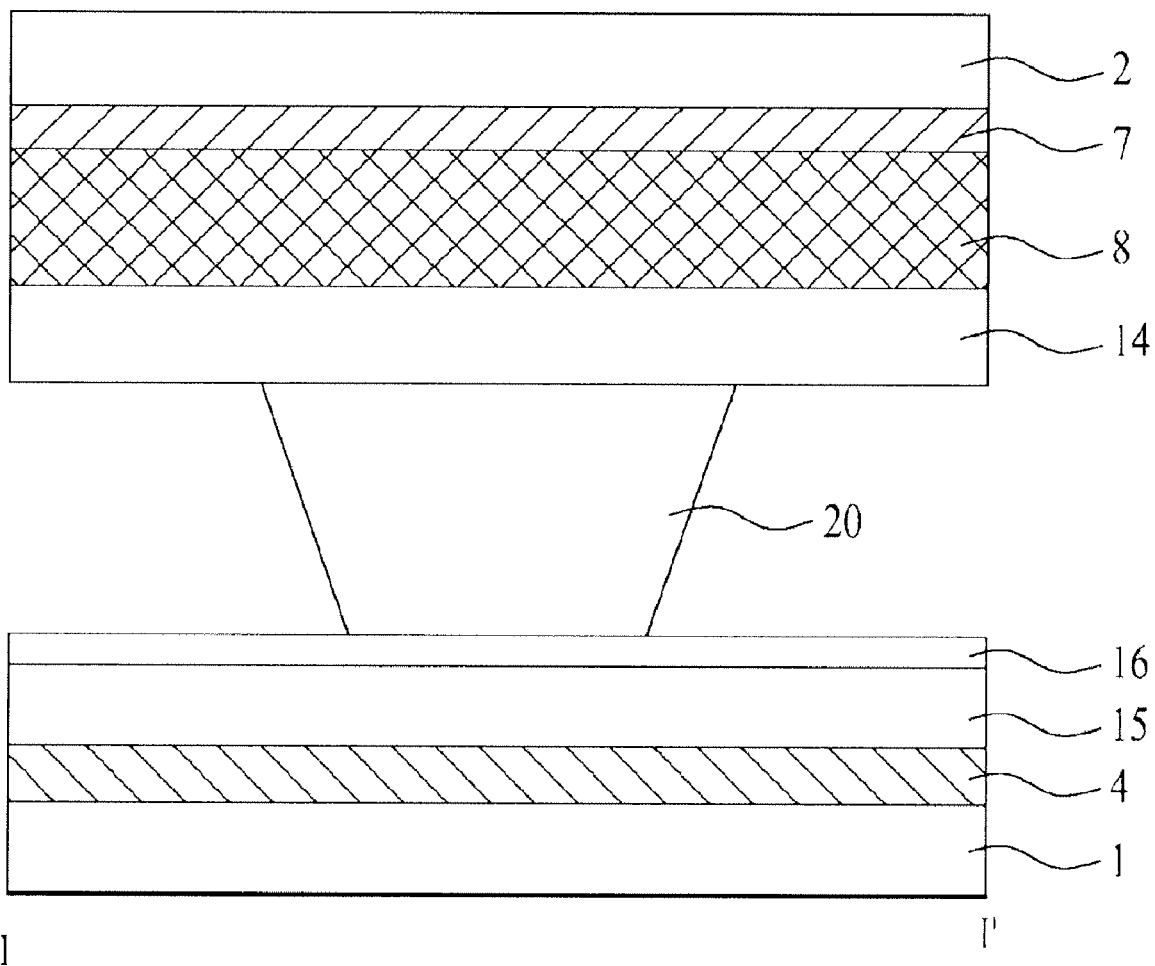
FIG. 1 is a sectional view illustrating a related art liquid crystal display device.
Figure 2:
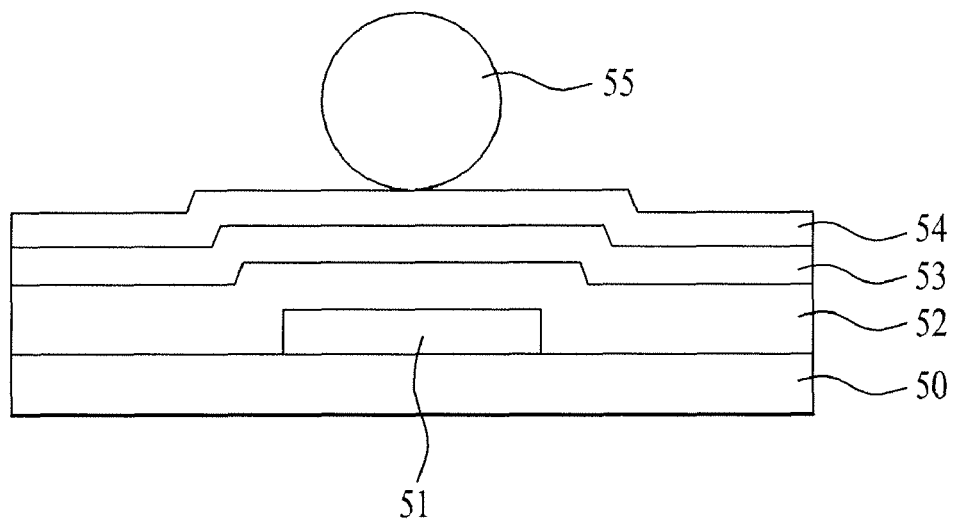
FIG. 2 is a sectional view illustrating a liquid crystal display device using a ball spacer.
Figure 3:
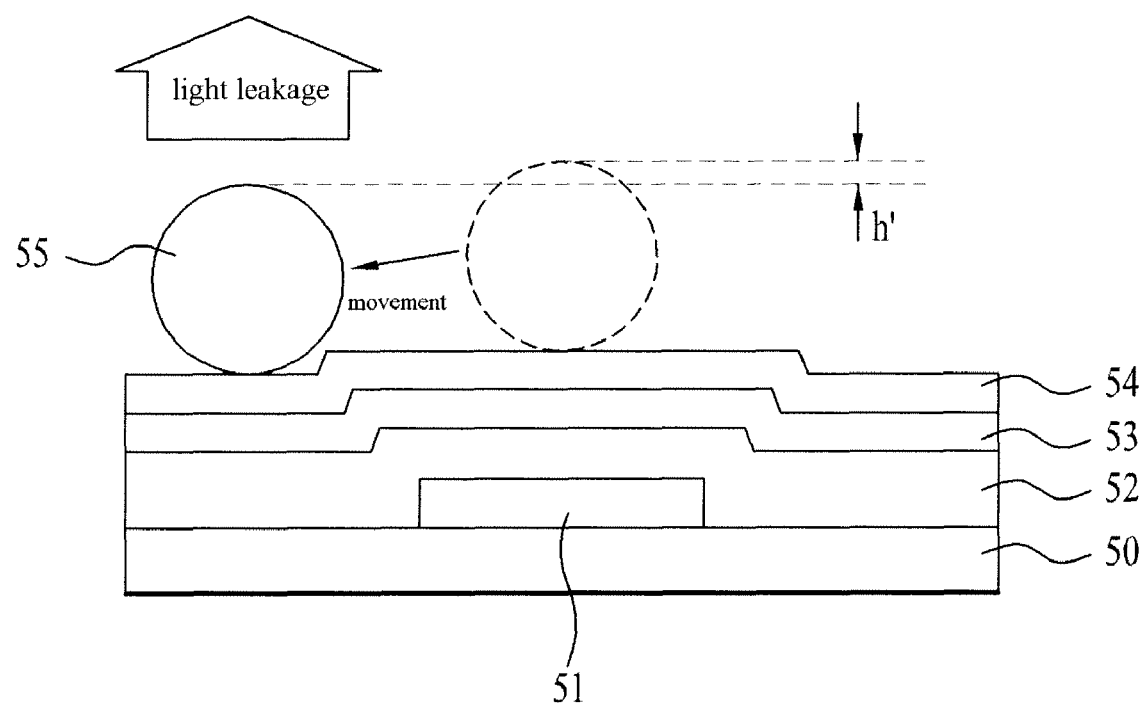
FIG. 3 is a sectional view illustrating a state in which the ball spacer of FIG. 2 moves upon fabrication or use.

FIG. 2 is a sectional view illustrating a liquid crystal display device using a ball spacer. FIG. 3 is a sectional view illustrating a phenomenon in which movement of the ball spacer of FIG. 2 occurs.

As shown in FIG. 2, in the liquid crystal display device using a ball spacer, the ball spacer 55 is arranged on the structure including a black matrix layer 51, a color filter layer 52, an overcoat layer 53 and an alignment film 54 arranged on a second substrate 50 in this order.

A method in which the ball spacer 55 is dotted in a desired position by ink-jetting has been suggested. After the ball spacer 55 is formed in the desired position, it moves from the desired position due to an applied external force during the formation process or an applied impact in use, as shown in FIG. 3. Thus, disadvantageously causing light leakage. That is, when the ball spacer 55 deviates from the original desired position, it comes out of the portion provided above the black matrix layer 51 and rolls toward a side of the portion. At this time, a height difference between the top of the ball spacer 55 which is dotted in the initial position, and the top of the ball spacer 55 which is arranged in the final position occurs, which is substantially comparable to the thickness of the black matrix layer 51. Such a height difference may cause variation in the cell gap after the ball movement. In addition, the height difference involves problems in that an aperture ratio is decreased due to the ball spacer 55 arranged out of regions provided by the black matrix layer, and scattering occurs on the surface of the ball spacer 55 which moves into a pixel region. Furthermore, the ball spacer 55 arranged in the pixel region results in a distorted orientation of liquid crystal, thus causing light leakage.

The ball spacer 55 of FIG. 2 is dispersedly formed on the surface provided with the alignment film 54.

Meanwhile, in an attempt to solve the problems occurring during the formation of the movable ball spacer, a method for forming spacers has been suggested, in which ball ingredients are mixed with a solid that can be adhered to the surface where the spacer is to be formed and the mixture is ink jetted in desired positions to fix spacers therein.

Hereinafter, an LCD device including spacers formed by ink jetting and a method for manufacturing the same will be illustrated.

Figure 4:
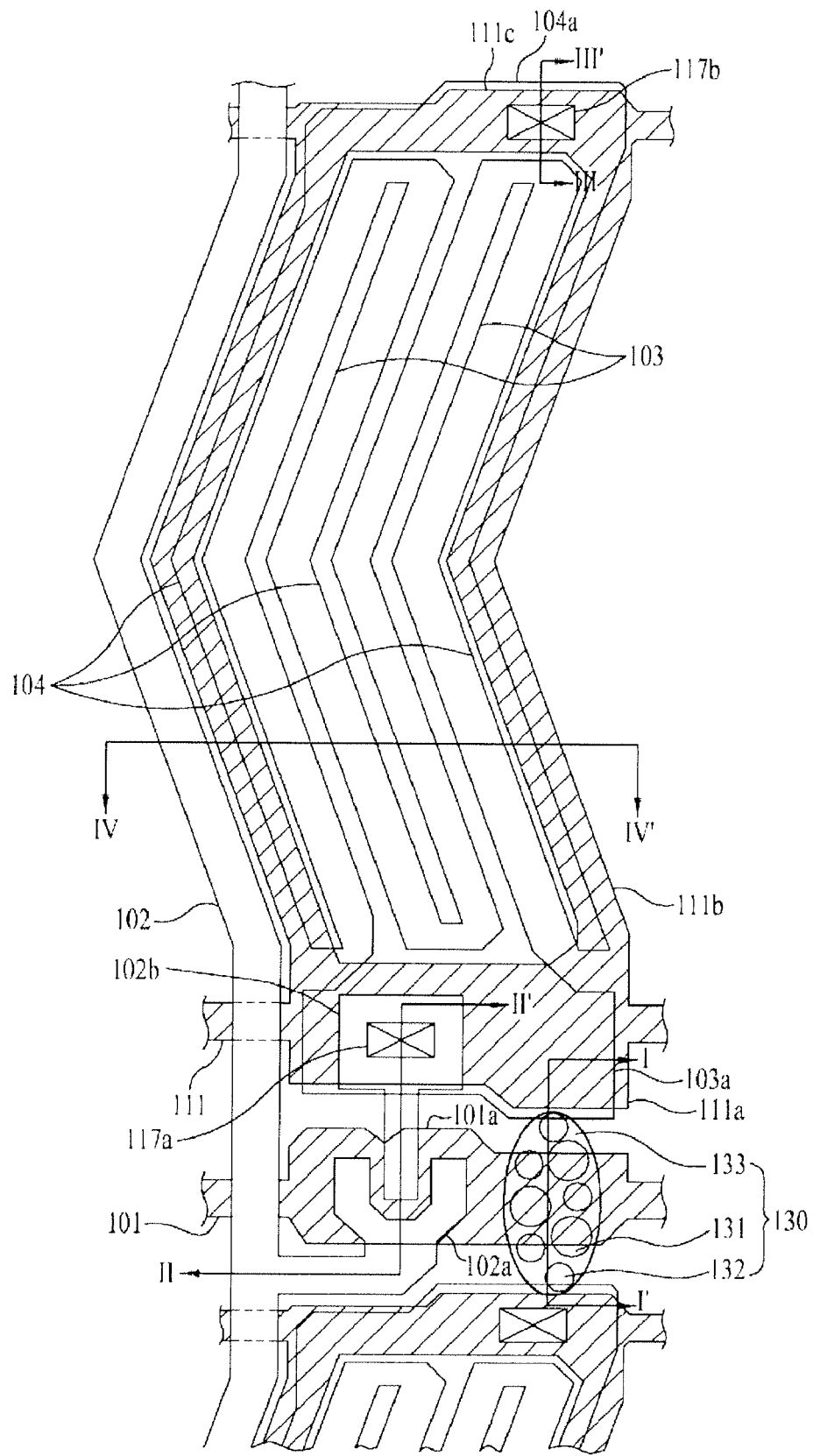
FIG. 4 is a plan view illustrating a liquid crystal display device.
Figure 5:
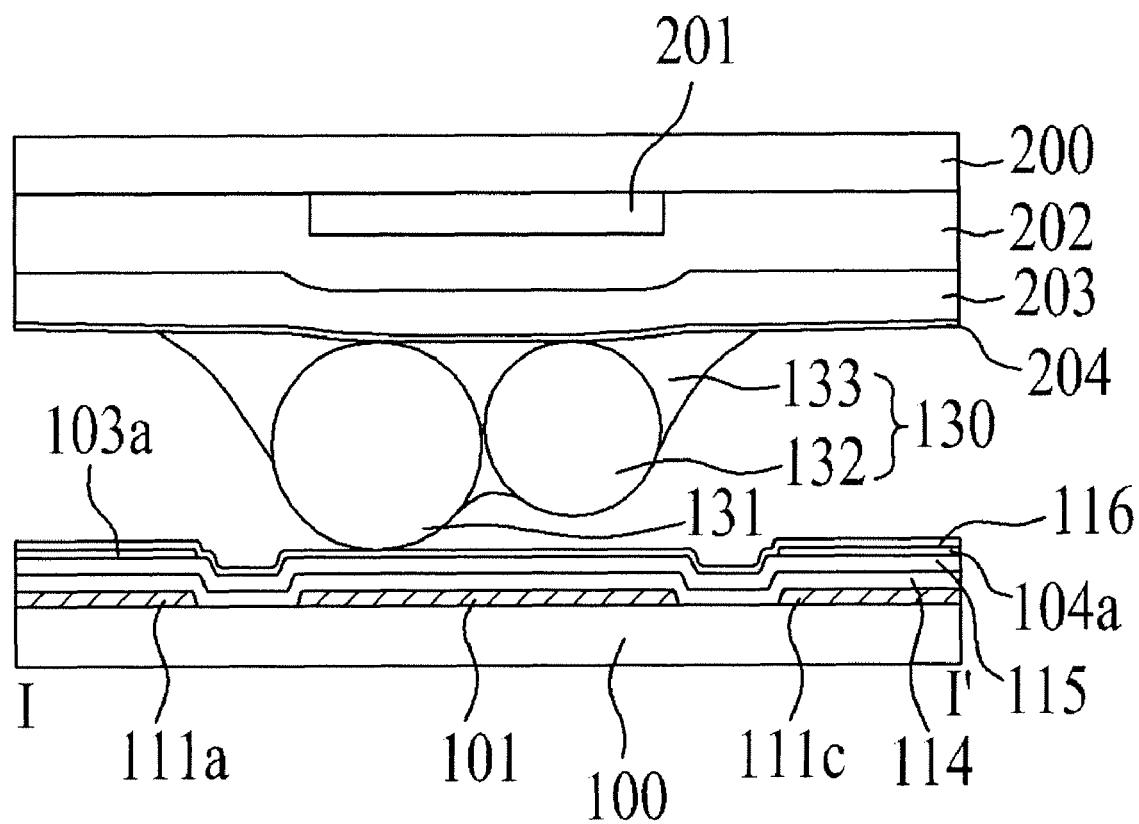
FIG. 5 is a sectional view illustrating a liquid crystal display device including spacers formed along the line I-I' of FIG. 4.
Figure 6:
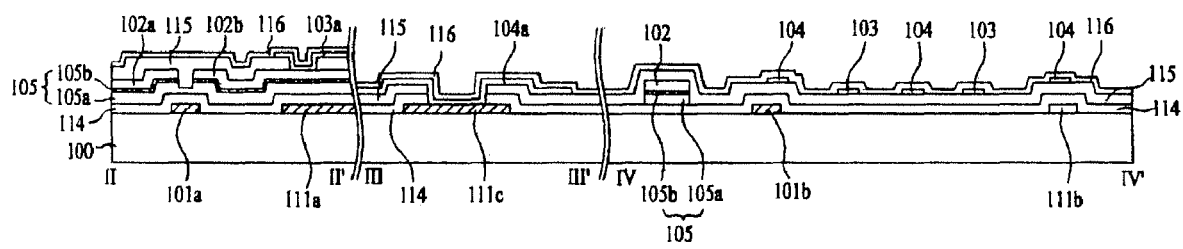
FIG. 6 is a sectional view taken along the lines and IV-IV' of FIG. 5.

FIG. 4 is a plan view illustrating a liquid crystal display device. FIG. 5 is a sectional view illustrating a liquid crystal display device including the spacer formed along the line I-I' of FIG. 4. FIG. 6 is a sectional view taken along the lines II-II', III-III' and IV-IV' of FIG. 5.

As shown in FIGS. 4 to 6, the liquid crystal display device according to the present invention comprises: a first substrate 100 and a second substrate 200 facing each other; a plurality of gate lines 101 and a plurality of data lines 102 arranged on the first substrate 100 such that the gate lines 101 and the data lines 102 cross each other to define pixel regions; thin film transistors (TFTs) located at each crossing of an associated data line and gate line; pixel electrodes 103 and common electrodes 104 alternately arranged in the respective pixel regions; and a liquid crystal layer (not shown) sealed between the first substrate 100 and the second substrate 200.

Hereinafter, the structure provided on the first substrate 100 will be described in detail.

A plurality of gate lines 101 and a plurality of data lines 102 are arranged on the first substrate 100, such that the gate lines 101 and the data lines 102 cross each other, to define pixel regions. In addition, common lines 111 are arranged on the first substrate 100 such that the common lines 111 extend in a direction substantially parallel to the gate lines 101.

In addition, thin film transistors are located at respective crossings of the data lines 101 and the gate lines 102. Each thin film transistor includes: a gate electrode 101a protruding from the associated gate line 101; a gate insulating film 114 formed over the entire surface of the first substrate 100 including the gate electrodes 101a, the gate lines 101 and the common lines 101; a "U"-shaped source electrode 102a and a drain electrode 102b arranged at both sides of the gate electrode 101a such that the drain electrode 102b is partially located in the "U"-shaped source electrode 102a; and semiconductor layers 105 (105a, 105b) arranged in regions including portions under the source electrode 102a and the drain electrode 102b, and channel portions between the source electrode 102a and the drain electrode 102b. The semiconductor layers 105 include an amorphous silicon layer 105a and an impurity semiconductor layer (n+ layer) 105b arranged thereon. The impurity semiconductor layer 105b is formed by removing the channel region present between the source electrode 102a and the drain electrode 102b. The shape of the source electrode 102a is not limited to the "U"-shape and may be "-"- or "L"-shaped.

The data line 102 has a central bent portion at each subpixel such that the data line 102 forms a zigzag line. The common line 111 is integrally formed with a storage electrode 111a at each pixel and the storage electrode 111a is connected to a common electrode connection electrode 111b which lies adjacent to both sides of the data line 102 and protrudes in parallel to the data line 102. As mentioned above, the data line 102 crosses the gate line 101 and has a bent portion at each pixel. Preferred embodiments of the present invention are not limited thereto and the data line 102 may perpendicularly cross the gate line 101, or may be tilted at a predetermined angle with respect to the gate line 101. In the illustrated drawings, the reason for imparting the bent portion to the data line 102 at each pixel is that the common electrode 104 and the pixel electrode 103 extend in parallel to the data line, and a vertically symmetrical electric field is thus generated, on the basis of the bent portion, which allows for orientation of liquid crystals in different directions and thus leads to an improvement in viewing angle.

The common electrode 104 and the pixel electrode 103 constitute a transparent electrode in the same layer at each pixel region and have alternately arranged portions. The common electrode 104 is partially overlapped with the common electrode connection electrode 111b arranged therebeneath. A second common electrode connection electrode 111c which extends in parallel to the gate line 101 has as an electrical contact a second contact portion 117b, which passes through the passivation film 115 and the gate insulating film 114 interposed between the common electrode 104 and the second common electrode connection electrode 111c.

In addition, the pixel electrode 103 is branched from the second storage electrode 103a overlapping the first storage electrode 111a, and has as an electrical contact a first contact portion 117a which passes through the passivation film 115 interposed between the pixel electrode 103 and the drain electrode 102b.

In addition, a first alignment film 116 is arranged over the entire surface of the passivation film 115 including the pixel electrode 103, the common electrode 104, the second storage electrode 103a and the third common connection electrode 104a.

The structure provided on the second substrate 200 will be illustrated in more detail.

The second substrate 200 comprises a black matrix layer 201 to shield light to regions (i.e., portions corresponding to the gate lines, the data lines and the thin film transistors) other than the pixel regions; R, G and B color filter layers 202 to render colors in the corresponding pixel regions; and an overcoat layer 203 arranged over the entire surface of the black matrix layer 201 and the color filter layers 202.

The second substrate 200 further comprises a second alignment film 204 arranged on the overcoat layer 203, and spacers 130 arranged in different regions provided by the black matrix layer 201 on the second alignment film 204.

The spacers 130 include one or more first balls 131 having a first diameter, one or more second balls 132 having a second diameter, and a solid material 133 to cohere the first balls 131 and the second balls 132 in the form of aggregates and adhere them to a surface of the second alignment film 204.

In this case, the spacers 130 comprise the first and second balls 131 and 132 that are different from each other in size. The first diameter of the first balls 131 is larger than the second diameter of the second balls 132.

In addition, the spacers 130 are arranged on the black matrix layer 201 in the structure provided on the second substrate 200, and at the same time, on the gate lines 101, the common lines 111 and other lines arranged in the same layer as these lines in the structure provided on the first substrate 100. The spacers 130 are arranged within the width of the black matrix layer 201 due to the solid 133. In FIG. 4, the spacers 130 are oval in the plane. The reason for the shape is that the spacers 130 are formed by spraying a spacer-forming material in a liquid state in the corresponding region from a head (not shown) of an ink jet system, allowing the liquid spacer-forming material to be suitably spread, followed by being cured. Consequently, since the liquid spacer material exhibits spreadability, prior to being jetted and then cured, the spacers 130 have an oval horizontal cross-section. Accordingly, the horizontal cross-section shapes of the spacers 130 which include the first and second balls 131 and 132 are not limited to circles.

At this time, the spacers 130 thus formed have a size comparable to the diameter of the first balls 131, and take the form of aggregates in which the first balls 131 and the second balls 132 are adhered to one another through the solid material 133. For this reason, the spraying may be partially carried out at a height slightly higher than the first balls 131. However, the liquid spacer-forming material is sprayed from the head and then spread, to form spacers 130 having a diameter comparable to that of the first ball 131. The first and second balls 131 and 132 have a substantially spherical shape.

The difference in diameter between the first and second balls 131 and 132 constituting the spacers 130, which is represented by "$\Delta H$", is about 0.05 to 1.0 μm. In this case, the first diameter of the first balls 131 corresponds to the thickness of the liquid crystal layer interposed between the first and second substrates 100 and 200, i.e., a cell gap and is determined within the range of about 2.0 to about 5.0 μm Accordingly, the second diameter corresponds to the difference between the first diameter and $\Delta H$.

It is preferable that $\Delta H$, the difference in height between the first and second balls 131 and 132, be about 0.2 to 0.6 μm when taking into consideration efficient improvement in both touch defects and gravity defects.

In this case, regions where the second balls 132 are arranged in the spacers 130 are low in level. As such, each spacer 130 has portions that differ from each other in level. Accordingly, in the portion of the spacer 130 where the first ball 131 is arranged, the surface of the first ball 131 is partially in contact with the first alignment film 116 provided on the first substrate 100, and in the portion where the second ball 132 is arranged, the second ball 132 is spaced apart from the surface of the first alignment film 116 provided on the first substrate 100 by the distance ($\Delta H$), corresponding to the diameter difference between the first and second balls 131 and 132.

Accordingly, in the spacer 130, the first ball 131 functions to maintain the cell gap, and the second ball 132 comes in contact with the outmost surface (i.e., the first alignment film 116) of the structure provided on the first substrate 100, when a predetermined external pressure is applied to the external surfaces of the first and second substrates 100 and 200, and thus shares the pressure along with the first ball 131, thereby preventing plastic deformation or breakage of the first ball 131 which results from concentration of pressure on the first ball 131 alone. As a result, it is possible to prevent press defects which are caused by the plastic deformation or damage of the first ball 131.

The spacer 130 can function to secure the cell gap based only on the partial contact between the spherical first ball 131 and the first alignment film 116. For this reason, although the first ball 131 is partially pressed by a predetermined pressure, it has a dot-like narrow contact area in contact with the first alignment film 116. Consequently, upon touch operations in which the first substrate 100 or the second substrate 200 is pushed in one direction, the surface friction force between the spacer 130 and the corresponding substrate can be reduced. Accordingly, the first and second substrates 100 and 200 shift in different directions and then readily return to their original states, thus preventing touch defects.

The spacer 130 is formed through an ink-jetting process using a predetermined head. At this time, the head is filled with an uncured liquid spacer-forming material and provided with a nozzle to spray the material in a predetermined region. The spacer is formed by jetting the spacer-forming material in the corresponding region through the nozzle and curing the material.

The spacer-forming material comprises the first and second balls 131 and 132, a liquid thermosetting binder in a liquid state prior to curing, and a solvent.

Each spacer includes one or more of the first balls 131 and one or more of second balls 132. In the process of each ink jetting for forming the spacer, respective balls are not jetted separately in corresponding regions, but respective drops comprising one or more first balls 131 and one or more second balls 132 are jetted therein.

The first and second balls 131 and 132 constitute the head, along with the liquid thermosetting binder and the solvent. Although the ink jetting is performed only once, the spacer 130 including balls which are different from each other in size can be formed.

The spacer 130 is formed in accordance with an ink jetting method, which is performed by jetting the spacer-forming material from the head in predetermined positions on the second alignment film 204. Upon each jetting, the head comprises at least one first ball and at least one second ball, to render the cured spacer 130 to have at least one first ball and at least one second ball. The spacer-forming material contained in the head comprises: a liquid material (represented by reference numeral "135" in FIG. 8) consisting of about 1 to 20 wt % of a thermosetting binder in a liquid state of the solid 133, and the remaining weight of a solvent (not shown); and about 0.1 to 3 wt % of the first and second balls 131 and 132, with respect to the total weight of the liquid material (thermosetting binder and the solvent).

In the process of ink-jetting, such a spacer-forming material including the plurality of balls is jetted in the corresponding region and then cured at about 80° C. to about 300° C. As a result, the liquid thermosetting binder is cured and then solidified in the form of aggregates including the plurality of first and second balls 131 and 132, while the solvent is vaporized.

The solid 133 is an uncured form of the thermosetting binder. For example, the solid includes at least one organic compound selected from acrylic, urethane, epoxy and silicone compounds. Specific examples of acrylic compounds may include ethyl methacrylate, N-butyl methacrylate, isobutyl methacrylate, dicyclopentanyl methacrylate, benzyl methacrylate, glycidyl methacrylate, 2-hydroxyethyl methacrylate, methacrylic acid isobornyl methacrylate and styrene polymers, and combinations thereof.

The solvent is selected from those that have a boiling point of about 60° C. to about 300° C. For example, glycol ether may be used as the solvent. Examples of useful glycol ethers include propylene glycol methyl ether (PGME), dipropylene glycol methyl ether (DGME), tripropylene glycol methyl ether (TGME), propylene glycol methyl ether acetate (PGMEA), dipropylene glycol methyl ether acetate (DGMEA), propylene glycol n-propyl ether (PGPE), dipropylene glycol n-propyl ether (DGPE), propylene glycol n-butyl ether (PGBE), dipropylene glycol n-butyl ether (DGBE), tripropylene glycol n-butyl ether (TGBE), propylene glycol phenyl ether (PGPE), propylene glycol diacetate (PGD), dipropylene glycol dimethyl ether (DGDE), diethylene glycol ethyl ether (DGEE), diethylene glycol methyl ether (DGME), diethylene glycol n-butyl ether (DGBE), diethylene glycol hexyl ether (DGHE), diethylene glycol n-butyl ether acetate (DGBEA), ethylene glycol propyl ether (EGPE), ethylene glycol n-butyl ether (EGBE), ethylene glycol hexyl ether (EGHE), ethylene glycol n-butyl ether acetate (EGBEA), triethylene glycol methyl ether (TGME), triethylene glycol ethyl ether (TGEE), triethylene glycol n-butyl ether (TGBE), ethylene glycol phenyl ether (EGPE) and ethylene glycol n-butyl ether mixtures (EGBEM).

Preferably, the solvent has a surface tension of about 20 to about 80 dynes/cm, a viscosity of about 1 to about 30 cP and a density of about 0.8 to about 1.2 g/cc at ambient temperature. Based on these properties, the solvent is vaporized and removed during curing at about 80 to 300° C.

In addition, the first and second balls 131 and 132 may be made of an organic compound, for example, divinylbenzene. The first and second balls 131 and 132 can be distinguished from other components, in that the first and second balls 131 and 132 are present in the form of a white powder, while the solid and the solvent are in a liquid state. If necessary, the first and second balls 131 and 132 may be subject to surface-treatment prior to being mixed into the spacer-forming material so that they can be distinguished from other liquid components.

Meanwhile, with respect to the content ratio of the first and second balls 131 and 132 of the spacer 130, the relatively large number of the second balls 132 is formed. The ratio between the first and second balls 131 and 132 is in the range of about 1:2 to 1:100. That is, in order to increase the liquid crystal margin range in which the levels of both touch defects and gravity defects are zero, the spacers 130 are formed, such that the number of the first balls 131 that exhibits high sensitivity to touch defects is smaller than that of the second balls 132 with respect to the total number of balls.

As mentioned above, the spacers 130 may be formed on the second alignment film 204. Alternatively, in reverse, after the spacers 130 are formed on the overcoat layer 203 or the common electrode, the second alignment film 204 may be formed on the overcoat layer 203 or the common electrode including the spacers 130.

The spacers 130 have a two-dimensional oval-like shape within the range of the width of the black matrix layer 201. That is, the number of the first and second balls 131 and 132 increases towards the center of the spacers, and on the other hand, the number of the first and second balls 131 and 132 decreases towards the edge of the spacers. The solid 133 prevents the jetted first and second balls 131 and 142 from being dispersed in portions where the spacers 130 are to be formed, instead being aggregated. Thus, the solid 133 functions to fix the first and second balls 131 and 132 on the second alignment film 204 or the overcoat layer 203.

Meanwhile, the color filter layer 202 may be arranged in pixel regions together with the black matrix layer 201, as shown in the drawings. In some cases, the color filter layer 202 may be selectively arranged only in pixel regions, or partially or entirely overlapped with the black matrix layer 201 in portions provided by the black matrix layer 201.

Hereinafter, a method for manufacturing the structure of the first substrate 100 including the thin film transistors, the common electrodes and the pixel electrodes will be illustrated in detail.

A metal such as Mo, Al or Cr is deposited on a first substrate 100 and is then patterned through photolithographic processes to simultaneously form a plurality of gate lines 101, gate electrodes 101a, common lines 111 extending parallel to the gate lines 101, first storage electrodes 111a integrally formed with the common lines 111, and first common electrodes 111b and second common electrodes 111c branched from the first storage electrodes 111a and protruded in pixel regions. At this time, the gate electrodes 101a are formed in predetermined positions provided by pixel regions such that they are protruded from the gate lines 201, and the first storage electrodes 111a, the first common connection electrodes 111b and the second common connection electrodes 111c are formed in the boundaries between adjacent pixel regions.

Then, an inorganic insulating material is deposited over the first substrate 100 provided with the gate lines 101, the common lines 111, the gate electrodes 101a, the first storage electrodes 111a, and the first and second common connection electrodes 111b and 111c, to form a gate insulating film 114.

Subsequently, an amorphous silicon layer 105a and an impurity semiconductor layer 105b are sequentially deposited on the gate insulating film 114.

A metal such as Mo, Al or Cr is deposited on the resulting structure and a photosensitive film is applied thereto. For example, the photosensitive film may be a negative photosensitive film.

The portions where the data lines, source electrodes and drain electrodes are formed define a light-transmission part, the channel portions of the semiconductor layers define a light-semitransmission part, and the remaining portions defined a light-shielding part. In this regard, masks (not shown) that correspond to the light-shielding part are positioned on the photosensitive film.

Subsequently, the photosensitive film is exposed to light and is then developed through the masks, to form a first photosensitive film pattern such that the portions provided by the light-transmission part remain unetched, the portions provided by the light-semi-transmission part are partially removed, and the portions provided by the light-shielding part are completely removed. The metal material is patterned using the first photosensitive film pattern (not shown) in accordance with photolithographic processes. The first photosensitive film pattern includes a first pattern which has a bent portion in each pixel region, while crossing the gate line 101, and a second pattern (corresponding to the light-transmission part where the source and drain electrodes are formed, including the light-semitransmission part of the masks) which is connected to the first pattern at the intersection of the gate line 101 and extends toward the pixel region. After the patterning of the metal using the first photosensitive film pattern, data lines 102 which cross the gate lines 101 and have a bent portion at respective pixel regions are formed, and dummy patterns (not shown) connected to the data lines 102 are formed in portions corresponding to the second pattern.

Subsequently, the impurity semiconductor layer 105b and the amorphous silicon layer 105a are selectively removed using the data lines 102 and the dummy patterns as masks.

Subsequently, with respect to the first photosensitive film pattern (not shown), the first photosensitive film pattern is subjected to ashing such that the photosensitive film provided by the light-semi-transmission part of the mask which has a relatively smaller thickness is removed, to form a second photosensitive film (not shown).

Subsequently, the portions, where the metal 102 (located in the same layer as the data line 102) and the impurity semiconductor layer 105b of the dummy pattern are exposed, are selectively removed using the second photosensitive pattern as a mask, to form source electrodes 102a and drain electrodes 102b and to pattern the impurity semiconductor layer 105b arranged thereunder. In this process, the impurity semiconductor layer 105b interposed between the source electrode 102a and the drain electrode 102b is removed. The removed region is defined as a channel portion. The source electrode 102a is formed in the "U" shape that protrudes from the data line 102 toward the pixel region. The drain electrode 102b is spaced apart from the source electrode 102a by a predetermined distance and is partially embedded in the "U" shape of the source electrode 102a.

Subsequently, a passivation film 115 is deposited over the gate insulating film 114 provided with the data lines 102, the source electrodes 102a and the drain electrodes 102b. At this time, the passivation film 115 is generally made of an inorganic material e.g., SiNx. In order to increase an aperture ratio of liquid crystal cells, low dielectric organic materials such as benzocyclobutene (BCB), spin on glass (SOG) and acryl may be used.

Subsequently, a portion of the passivation film 115 is selectively etched in predetermined portions on the drain electrode 102b to form a first contact portion 117a, and the passivation film 115 and the gate insulating film 114 provided in predetermined portions on the second common connection electrode 111c are selectively removed to form a second contact portion 117b.

Subsequently, a transparent electrode is deposited over the passivation film 115 including the first and second contact portions 117a and 117b and is then selectively removed, to form a plurality of common electrodes 104 which are partially overlapped with the common electrode connection electrodes 111b at respective pixels and spaced apart from one another, third common connection electrodes 104a overlapping the second common connection electrodes 111c and connecting the common electrodes 104 in pixel regions of the common electrodes 104, and a plurality of pixel electrodes 103 alternating with the common electrodes 104.

Subsequently, a first alignment film 116 is formed over the entire surface of the passivation film 115 including the pixel electrode 103 and the common electrodes 104.

Hereinafter, a manufacturing method performed on the second substrate of the liquid crystal display device according to the present invention will be described with reference to the drawings.

Figure 7:
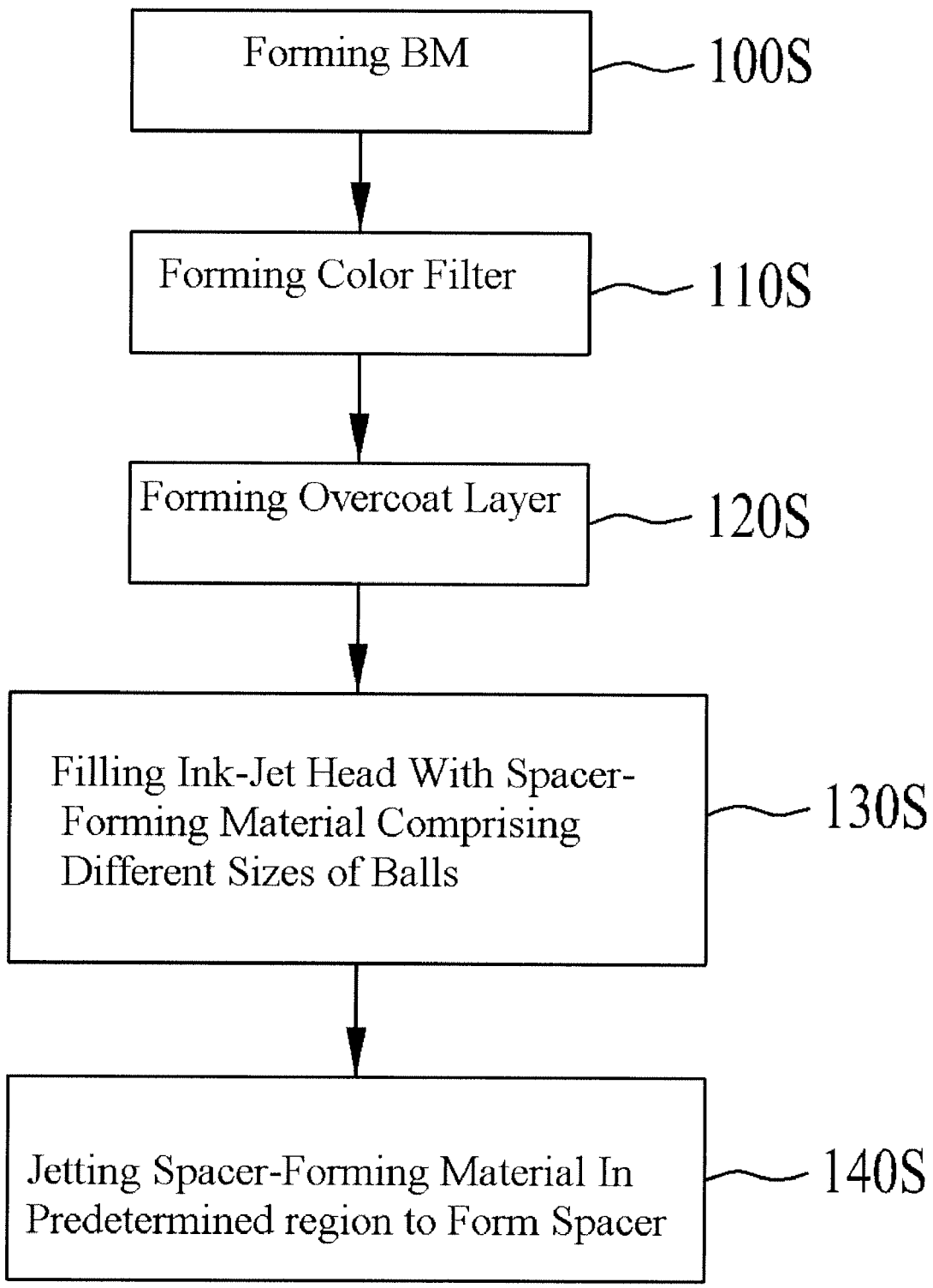
FIG. 7 is a flow chart illustrating a method for manufacturing a second substrate of the liquid crystal display device according to the present invention.
Figure 8:
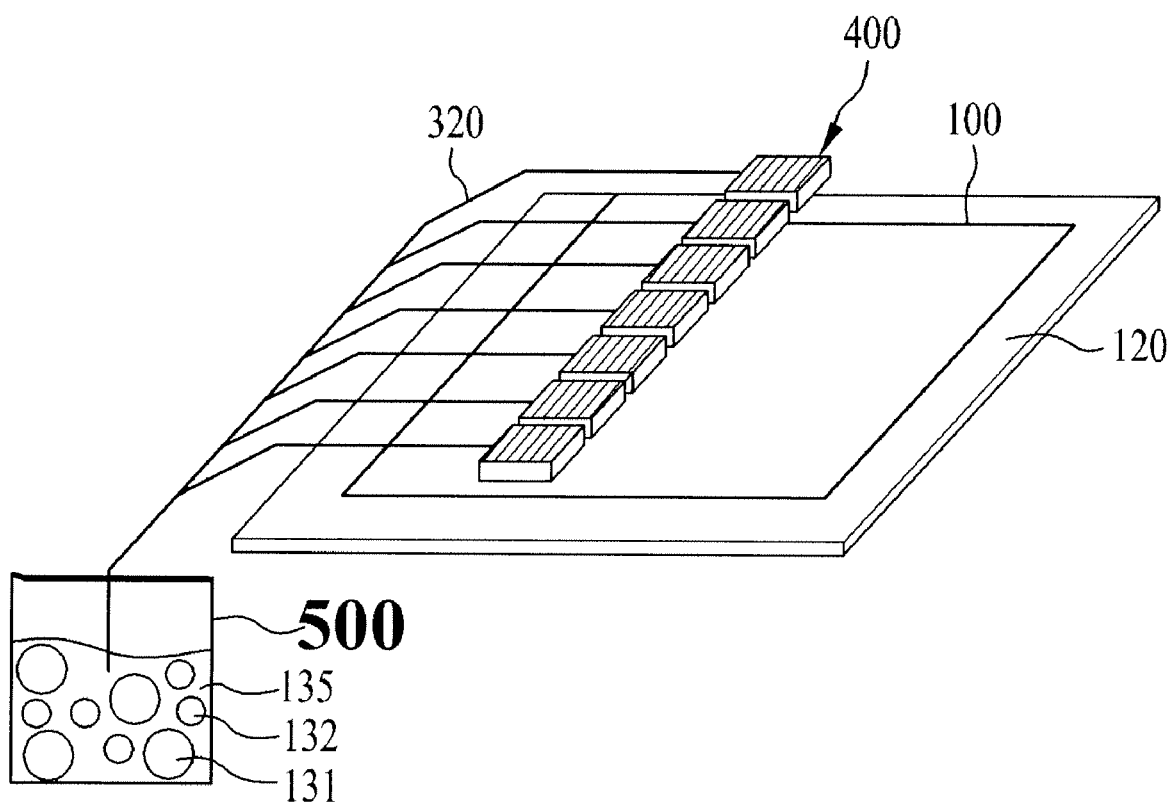
FIG. 8 is a schematic view illustrating an inkjet system used for the formation of spacers.
Figure 9:
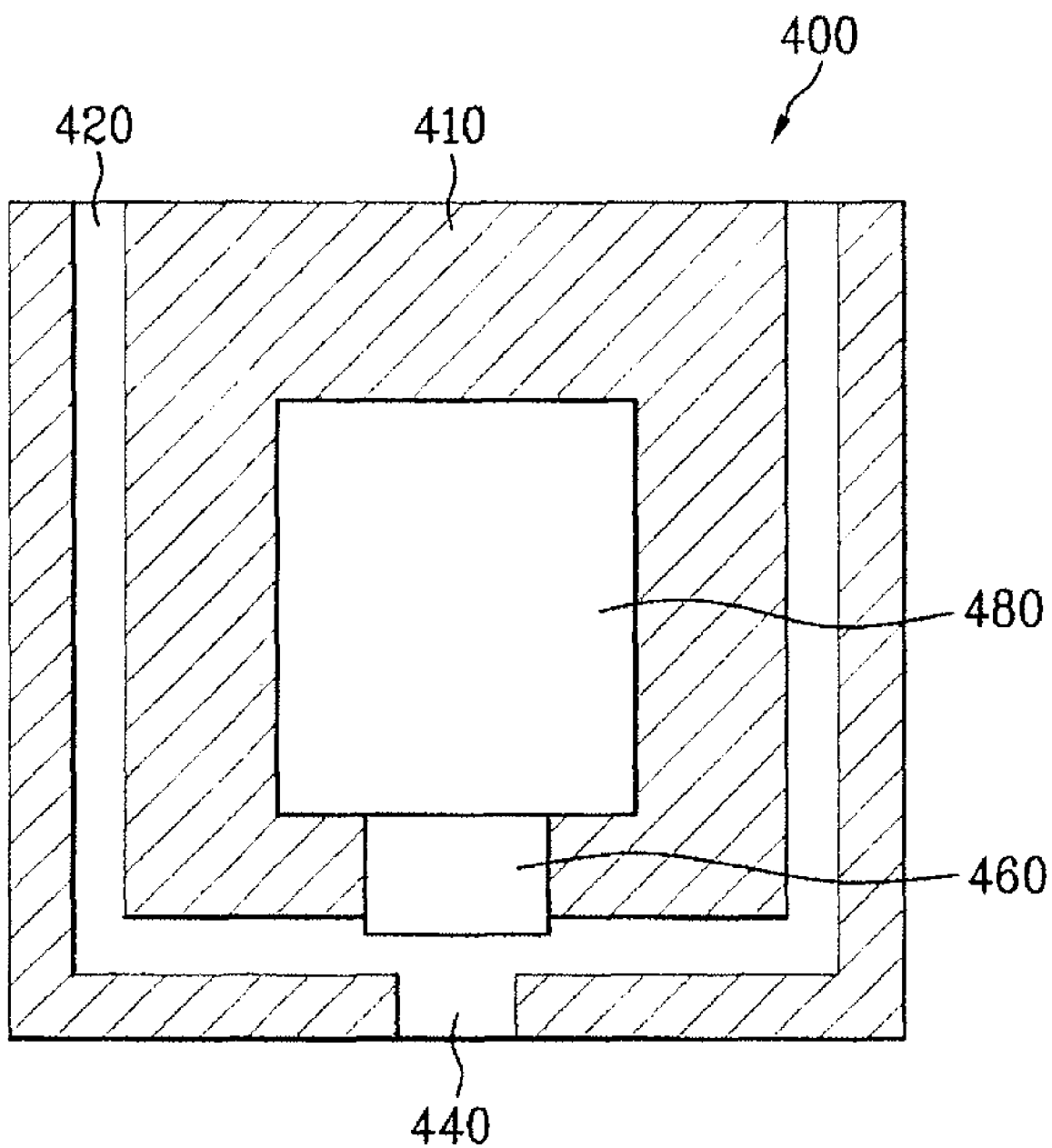
FIG. 9 is a view illustrating a head of the inkjet system of FIG. 8.

FIG. 7 is a flow chart illustrating a method for manufacturing the second substrate of the liquid crystal display device according to the present invention. FIG. 8 is a schematic view illustrating an inkjet system to form spacers. FIG. 9 is a view illustrating a head of the inkjet system of FIG. 8.

As shown in FIGS. 4, 5 and 7 to 9, first, a black matrix layer 201 is formed on the second substrate 200 in a region other than the pixel regions (100S), which serves to shield light of portions corresponding to gate lines, data lines and thin film transistors, other than the pixel regions.

Subsequently, R, G and B color filter layers 202 for rendering colors at respective pixels are formed (110S).

Subsequently, an overcoat layer 203 is formed over the black matrix layer 201 and the color filter layers 202. (120S).

Subsequently, a second alignment film 204 is formed on the overcoat layer 203.

Subsequently, a head 400 is filled with the afore-mentioned spacer material consisting of first balls having a first diameter, second balls having a second diameter smaller than the first diameter, the liquid thermosetting binder and the solvent (130S). At this time, the head 400 is filled with a liquid material 135 consisting of the solvent and the thermosetting binder, supplied through a supply pipe 420 equipped therein. The first balls 131 and the second balls 132 are present in an amount not more than 0.1 to 3.0 wt %, with respect to the total weight of the liquid material 135.

The predetermined spacer-forming material is jetted in predetermined portions of the black matrix layer 201 on the second alignment film 204 through a nozzle 440 mounted in the head 400 and then cured to form spacers 130 (140S). In the process of heating, after the jetting, the volatile solvent is removed and the liquid thermosetting binder is cured, as shown in FIG. 5. The first and second balls 131 and 132 are aggregated together to form a solid 133 to be adhered to the second alignment film 204.

Meanwhile, the ink-jetting process used for the spacer formation will be illustrated below.

Preferably, the head mounted in an ink jetting system used for the ink-jetting process further includes a discharge means to transfer a predetermined material supplied from a supply pipe to a nozzle and discharge it to the outside. Preferably, the discharge means includes a piezoelectric device arranged opposite the nozzle such that the supply pipe is interposed between the nozzle and the piezoelectric device, and a voltage applier connected to the piezoelectric device to apply a voltage thereto.

The piezoelectric device exhibits the piezoelectric effect. The term "piezoelectric effect" refers to a phenomenon in which when a pressure is applied to a crystal substrate in a predetermined direction, positive and negative electric charges corresponding to the external force are generated on opposite surfaces of the crystal substrate. Such a phenomenon was first discovered in 1880 by the French brothers Jacques Curie and Pierre Curie. Thereafter, the fact that one crystal substrate generates only a slight piezoelectricity, and on the other hand, when the substrate is overlapped with several pieces of metal foils, it generates greatly increased piezoelectricity, was also discovered. Furthermore, the fact that the crystal substrate has inherent vibrations, and is combined with the piezoelectric device to create stronger vibration, when elastic vibration corresponds to electric vibration, was discovered.

Based on such a phenomenon, piezoelectric devices were designed to be utilized in a variety of applications. Crystal, tourmaline, Rochelle salts, etc. are used as materials for piezoelectric devices. Recently known artificial crystals such as barium titanate, ammonium dihydrogen phosphate and ethylenediamine tartrate are also used as materials for piezoelectric devices.

As shown in FIG. 8, the ink jetting system includes a substrate stage 210, a supply tank 300, a head 300 and a pipe 320 connecting the supply tank 300 to the head 400.

The substrate stage 210 serves to support the substrate 200 and is preferably movable in a certain direction.

The supply tank 300 stores a predetermined material e.g., an oriented material, and the stored material is supplied through the pipe 320 to the head 400.

The head 400 may be plural in number, the number thereof may be suitably determined while taking into consideration the factors such as the size of the substrate, and the head 400 is preferably movable in a predetermined direction.

The structure of the head 400 will be illustrated with reference to FIG. 9.

As shown in FIG. 9, the head 400 may include a plurality of nozzles for discharging the spacer-forming material, and in this drawing, only one nozzle is illustrated.

The head 400 includes a head body 410, a supply pipe 420, a nozzle 440, a piezoelectric device 460 and a voltage applier 480.

The supply pipe 420 serves as a passage through which the predetermined material e.g. an oriented material flows. The passage allows the external predetermined material to be supplied into the head 400.

The nozzle 440 has a predetermined portion which is connected with the supply pipe 420 and allows for discharge of the predetermined material.

The piezoelectric device 460 is arranged opposite the nozzle 440 such that the supply pipe 420 is interposed between the piezoelectric device 460 and the nozzle 440. The piezoelectric device 460 causes mechanical deformation due to an applied voltage, thus contracting the passage of the supply pipe 420 and allowing the predetermined material from the supply pipe 420 to the outside through the nozzle 440.

The voltage applier 480 applies a voltage to the piezoelectric device 460 and is connected thereto.

Hereinafter, a method for forming the spacers of the liquid crystal display device associated with an ink jetting system will be illustrated with reference to FIGS. 8 and 9.

The supply tank 300 is filled with first and second balls 131 and 132 having different sizes, i.e., a first diameter and a second diameter, respectively, and a liquid material 135 consisting of a liquid thermosetting binder and a solvent.

When a gas, e.g., nitrogen is injected into the supply tank 300, the supply tank 300 undergoes an increase in internal pressure, which causes the spacer-forming material present in the supply tank 300 to be supplied through the pipe 320 into the head 400. The pipe 320 used herein has a diameter larger than those of the first balls 131 and the second balls 132.

The spacer-forming material supplied into the head 400 is sprayed through the nozzle 440 present in the head 400 and discharged in the predetermined portions of the second alignment film 204 over the black matrix layer 201 on the second substrate 200. In this discharge process, since the spacer-forming material has slight spreadbility and is oval in the plane, it is cured through a heating process to form a spacer 130.

The pipe 320 is connected with the supply pipe 420 in the head 400. Thus, the spacer-forming material supplied via the pipe 320 flows through the supply pipe 420 in the head 400. At this time, when the voltage applier 480 applies a voltage to the piezoelectric device 460, the piezoelectric device 460 causes mechanical deformation, thus contracting the passage of the supply pipe 420 and allowing the spacer-forming material to be discharged through the opposite nozzle 440.

At this time, at least one of the head 400 and the substrate stage 210 is movable in a predetermined direction. Accordingly, when a large area of the second substrate 200 is provided, the second substrate 200 is divided into portions and ink-jetting processes through the heads 400 provided in the ink-jetting system are carried out in respective portions.

An example where the liquid crystal display device according to the present invention employs an in-plane switching (IPS) mode was illustrated with reference to FIGS. 4 to 6. In the cases where the aforementioned first and second spacers are applied to TN-mode liquid crystal display devices in which pixel electrodes are formed at respective pixels and common electrodes are further formed on the second substrate, it is possible to obtain the same effects as in the example.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for manufacturing a liquid crystal display device comprising:
    preparing a first substrate and a second substrate;
    forming a plurality of gate lines and a plurality of data lines in respective non-pixel regions on the first substrate such that the gate lines and the data lines cross each other to define pixel regions;
    forming a plurality of thin film transistors at respective crossings between the gate lines and the data lines;
    forming a black matrix layer on the second substrate in portions corresponding to the non-pixel regions;
    ink-jetting a spacer-forming material in predetermined portions provided on the black matrix layer between the first and second substrates to form spacers, wherein the spacer-forming material comprises at least one first ball having a first diameter, at least one second ball having a second diameter smaller than the first diameter, a liquid thermosetting binder and a solvent and wherein the ratio between the first and second balls is in the range of about 1:2 to 1:100; and
    forming a liquid crystal layer between the first substrate and the second substrate, and joining the first substrate to the second substrate.

2. The method according to claim 1, wherein the first diameter of the first balls is about 2.0 to about 5.0 µm and the difference between the first diameter and the second diameter is about 0.05 to about 1.0 µm.

3. The method according to claim 1, wherein the spacer-forming material comprises a liquid material consisting of the liquid thermosetting binder and the solvent, and about 0.1 to about 3.0 wt % of the first and second balls, with respect to the total weight of the liquid material,
    wherein the liquid thermosetting binder is present in an amount of about 1.0 to about 20.0 wt %, based on about 100 wt % of the total weight of the liquid material.

4. The method according to claim 3, further comprising:
    after formation of the spacers, heating the spacers to cure the liquid thermosetting binder and vaporize the solvent.

5. The method according to claim 4, wherein the heating process is carried out at about 80 to about 300° C.

* * * * *